United States Patent [19]
Van Gestel

[11] Patent Number: 5,859,670
[45] Date of Patent: Jan. 12, 1999

[54] METHOD AND ARRANGEMENT FOR TRANSMITTING TELETEXT PAGES IN THE VERTICAL BLANKING AND ACTIVE VIDEO INTERVALS

[75] Inventor: Henricus A. W. Van Gestel, Eindhoven, Netherlands

[73] Assignee: U. S. Philips Corporation, New York, N.Y.

[21] Appl. No.: 881,604

[22] Filed: Jun. 24, 1997

[30] Foreign Application Priority Data

Jun. 28, 1996 [EP] European Pat. Off. ............ 962018024

[51] Int. Cl.[6] .................................................. H04N 7/08
[52] U.S. Cl. ........................ 348/473; 348/468; 348/478
[58] Field of Search ........................... 348/473, 476–479, 348/468, 465; H04N 7/08, 7/087

[56] References Cited

U.S. PATENT DOCUMENTS

| | | | |
|---|---|---|---|
| 4,719,510 | 1/1988 | Kinghorn | 345/468 |
| 4,953,022 | 8/1990 | Bugg | 348/468 |
| 5,184,220 | 2/1993 | Kinghorn | 348/468 |
| 5,355,170 | 10/1994 | Eitz et al. | 348/468 |
| 5,585,857 | 12/1996 | Van Gestel | 348/468 |
| 5,589,886 | 12/1996 | Ezaki | 348/468 |

OTHER PUBLICATIONS

EBU Interim Technical Document SPB 492 "Teletext Specification 625 Line Television Systems", Dec. 1992.

*Primary Examiner*—Victor R. Kostak
*Attorney, Agent, or Firm*—Steven S. Rubin

[57] ABSTRACT

Conventional teletext decoders only respond to teletext data lines in the vertical blanking interval of a television signal. The decoders erroneously respond to conventional full-channel teletext transmissions in which all lines of the television signal are used for teletext. The method in accordance with the invention transmits teletext pages in the vertical blanking interval of the television signal in a conventional manner. Additionally, pages are also transmitted in the active video interval. A supplemental page header in each active video interval is provided to prevent teletext rows in the vertical blanking interval from being interpreted as rows of a page which is transmitted in the active video interval.

20 Claims, 5 Drawing Sheets

|  n  | n+1 | n+2 | n+3 | n+4 |
|-----|-----|-----|-----|-----|
| 158/21 | 159/1 | 159/9 | 160/20 | 161/2 |
| 158/22 | 159/3 | 159/11 | 160/21 | 161/4 |
| 158/23 | 159/5 | 159/13 | 160/22 | 161/6 |
| 159/0 | 159/7 | 160/0 | 161/0 | 161/8 |

FIG. 2
PRIOR ART

|  n  | n+1 | n+2 | n+3 | n+4 |
|-----|-----|-----|-----|-----|
| 158/21 | 171/1 | 183/5 | 195/9 | 107/13 |
| 158/22 | 171/2 | 183/6 | 195/10 | 107/14 |
| 158/23 | 171/3 | 183/7 | 195/11 | 107/15 |
| 159/0 | 171/4 | 183/8 | 195/12 | 107/16 |
| 159/1 | 171/5 | 183/9 | 195/13 | 107/17 |
| . | . | . | . | . |
| 159/23 | . | . | . | . |
| 160/0 | . | . | 199/23 | . |
| . | . | . | 100/0 | . |
| . | . | . | . | . |
| 171/0 | 183/4 | 195/8 | 107/12 | 119/16 |

| | n | n+1 | n+2 | n+3 | n+4 |
|---|---|---|---|---|---|
| 10 — | 158/21<br>158/22<br>158/23<br>159/0 | 159/1<br>159/3<br>159/5<br>159/7 | 159/9<br>159/11<br>159/13<br>160/0 | 160/20<br>160/21<br>160/22<br>161/0 | 161/2<br>161/4<br>161/6<br>161/8 |
| 20 —<br>25 — | 112/0<br>112/20<br>·<br>·<br>123/0<br>·<br>123/17<br>159/0 | 26—123/0<br>123/18<br>·<br>·<br>·<br>·<br>134/15<br>159/0 | 134/0<br>134/16<br>·<br>·<br>·<br>·<br>145/13<br>160/0 | 145/0<br>145/14<br>·<br>·<br>·<br>·<br>156/11<br>161/0 | 156/0<br>156/12<br>·<br>·<br>·<br>·<br>167/9<br>161/0 |
| | 22 | 22 | 23 | 24 | 24 |

FIG. 9

| | n | n+1 | n+2 | n+3 | n+4 |
|---|---|---|---|---|---|
| 10 — | 158/23<br>159/0<br>210/19<br>210/20 | 159/1<br>159/3<br>210/21<br>210/22 | 159/5<br>159/7<br>210/23<br>211/0 | 159/9<br>159/11<br>211/1<br>211/2 | 159/13<br>160/0<br>211/3<br>211/4 |
| 27 —<br>20 —<br>28 — | 112/0<br>112/20<br>·<br>118/17<br>159/0<br>287/0<br>287/6<br>·<br>293/3<br>210/0 | 118/0<br>118/18<br>·<br>124/15<br>27—159/0<br>293/0<br>293/4<br>·<br>299/1<br>28—210/0 | 124/0<br>124/16<br>·<br>130/13<br>27—159/0<br>299/0<br>299/2<br>·<br>204/23<br>211/0 | 130/0<br>130/14<br>·<br>136/11<br>27—159/0<br>205/0<br>·<br>·<br>210/21<br>211/0 | 136/0<br>136/12<br>·<br>142/9<br>160/0<br>210/0<br>210/22<br>·<br>216/19<br>211/0 |

METHOD AND ARRANGEMENT FOR TRANSMITTING TELETEXT PAGES IN THE VERTICAL BLANKING AND ACTIVE VIDEO INTERVALS

FIELD OF THE INVENTION

The invention relates to a method and arrangement for transmitting teletext pages in vertical blanking intervals and active video intervals of a television signal, comprising the step of transmitting, for each page, a page header data packet and a plurality of further data packets.

BACKGROUND OF THE INVENTION

A method of transmitting teletext pages as mentioned in the opening paragraph is disclosed in EBU Interim Technical Document SPB 492 "Teletext Specification 625 line television systems", December 1992. Transmission of teletext pages in vertical blanking intervals (VBI) of a television signal is widely used in many countries of the world. Transmission of teletext pages in both the vertical blanking intervals and active video intervals, as is the case here, is often referred to as full-channel teletext transmission.

VBI teletext transmissions typically use 2 to 12 television lines of each vertical blanking interval and offer a page rate of 4 to 24 pages/sec. Full-channel teletext transmissions using all available television lines typically offer a page rate of 600 pages/sec. The access time of a full-channel teletext service is thus smaller, or the number of pages is proportionally larger than that of a VBI teletext service.

A problem of full-channel teletext is that conventional VBI decoders, of which billions have meanwhile been installed, erroneously respond to conventional full-channel teletext transmissions.

OBJECT AND SUMMARY OF THE INVENTION

It is an object of the invention to provide a method of transmitting full-channel teletext which can be decoded by conventional VBI decoders in a compatible manner.

To achieve this, the method in accordance with the invention is characterized by transmitting the data packets for a first series of pages in vertical blanking intervals and transmitted the data packets for a second series of pages in active video intervals. After the data packets for the last page have been transmitted in an active video interval, a supplemental page header data packet identifying a page different from said last page is transmitted.

The first series of teletext pages is transmitted in accordance with a conventional VBI transmission and is thus accessible by conventional VBI decoders. Full-channel teletext decoders respond to the data packets in both intervals. The supplemental page header causes the transmission of the last page which has been transmitted in an active video interval to be closed prior to the next VBI. Full-channel decoders which acquire said last page will thus not mix up said page with rows of a VBI page.

The supplemental page header data packet in the active video interval and further data packets in the subsequent VBI constitute a valid teletext page. To prevent such a "supplemental" page from being displayed, the supplemental page header data packet identifies a hexadecimally numbered teletext page. Such a page cannot be requested by the user and will therefore not be displayed. In this embodiment, the full-channel decoder responds to the data packets in the active video interval only. Preferably, however, the supplemental page header identifies the page which is currently transmitted in the vertical blanking interval. In this embodiment, the full-channel decoder also correctly responds to the data packets in the VBI.

Another embodiment is characterized by first transmitting a page header data packet in a subsequent active video interval prior to transmitting further data packets in said subsequent active video interval. Said page header causes the page transmission in the active video intervals to be resumed after each VBI. The page header is preferably the page header of the last page in the previous active video interval. This allows the last page in the active video interval to be temporarily interrupted by a VBI page and to be resumed in the next active video interval. The efficiency of teletext transmission is thereby improved.

It should be noted that the first and second series of pages may comprise different teletext pages or the same pages. In the first-mentioned case, full-channel decoders can access more pages than VBI decoders. In the second case, full-channel decoders have a smaller access time than VBI decoders. Combinations thereof are also possible.

BRIEF DESCRIPTION OF THE FIGURES

FIGS. 2 and 3 show diagrams illustrating conventional teletext transmissions.

FIGS. 4–6 show diagrams illustrating embodiments of full-channel teletext transmissions in accordance with the invention.

FIG. 9 shows a diagram illustrating a further embodiment of a full-channel teletext transmission in accordance with the invention.

DESCRIPTION OF EMBODIMENTS

Figure 1A:
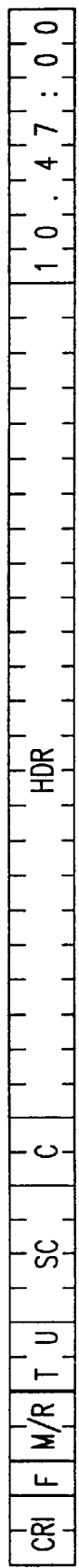
FIGS. 1A and 1B show the known structure of teletext data packets.
Figure 1B:
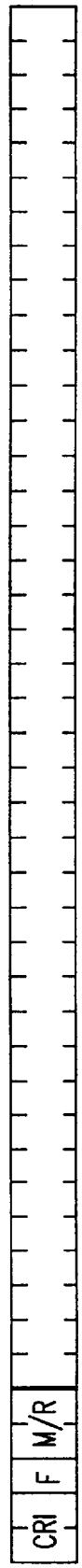

In order that the invention can be readily understood, conventional teletext transmissions will be described first. FIGS. 1A and 1B show the structure of teletext data packets. One such a data packet is accommodated in a line of a conventional television signal. Each data packet comprises 45 bytes of 8 bits each. The first 2 bytes having a fixed value 1010 . . . 10 are referred to as "clock run-in" and are denoted CRI in the Figures. The third byte is a "framing code" F and has also a fixed value. The next 2 bytes comprise a 3-bit magazine number M and a 5-bit row number R. The significance of the subsequent 40 bytes depends on the value of the row number R. If the row number R has the value 0, as is assumed in FIG. 1A, the data packet is a page header data packet, hereinafter denoted "page header" for short. The series of 40 bytes of such a page header identifies the tens T and units U of the page number, and further comprises a sub-code SC and a plurality of control bits C. The remaining part comprises 24 character positions with a page header text HDR and 8 character positions for displaying the current time. If the row number R has one of the values 1–23, as is assumed in FIG. 1B, then the 40 bytes of the data packet constitute a text row of 40 characters for display on the screen. Such a data packet will hereinafter also be denoted "row" for short.

The transmission of a teletext page starts with, and implies, the page header of this page. The page number is constituted by the magazine number M, tens T and units U.

It is a 3-digit number and is generally between 100 and 899. The page header and all subsequent data packets having the same magazine number M constitute the page. A page is completed if a page header having a different page number is transmitted. It should be noted that the criterion for a page being completed is slightly different in a particular operation mode, referred to as parallel magazine mode. This aspect will be dealt with later.

FIG. 2 shows a diagram illustrating a conventional VBI teletext transmission. It is assumed that one hundred teletext pages having the page numbers 100–199 are transmitted in a cyclic manner. The Figure shows five successive fields n to n+4 of a television signal. Each field comprises a vertical blanking interval 10 and an active video interval 20. The VBI comprises a plurality of television lines, four of which are used in the present example for transmitting teletext pages. The active video interval comprises 288 lines and conveys a television program in a conventional manner. For the sake of convenience, each teletext data packet is denoted P/R, in which P constitutes the page number and R the row number. However, in view of the foregoing it will be appreciated that the full 3-digit page number P is actually encoded in page headers (R=0) only. For the sake of clarity, page headers are shown in bold type. It will be noted that the page header and subsequent rows of a page are not transmitted in the same VBI. This is done to allow VBI decoders to erase a previously displayed page upon receiving the page header of a new page. It will further be noted that empty rows need not be transmitted in VBI transmissions. Thus, FIG. 2 shows the transmission of page 159 comprising rows 1, 3, 5, 7, 9, 11, 13, page 160 comprising rows 20, 21, 22, and page 161 comprising rows 2, 4, 6, 8, . . . . With an average of, say, 20 transmitted data packets per page, it takes 500 fields to transmit a cycle of one hundred pages, i.e. 10 seconds for a 50 Hz television signal.

FIG. 3 shows a diagram illustrating a conventional full-channel teletext transmission. It will again be assumed that pages 100–199 are transmitted in a cyclic manner. Now, 292 data packets are accommodated in each television field, viz. 4 in the vertical blanking interval 10 and 288 in the active video interval 20. In the full-channel mode, all rows R=0 to R=23 including empty rows are transmitted. This is done because conventional full-channel decoders are not able to erase a previously displayed page in the short period between the reception of a page header and a subsequently received row. Approximately twelve pages can thus be transmitted in each television field. It will be appreciated that the total number of one hundred pages is now transmitted in approximately 8 TV fields only, i.e. in less than 0.2 second.

The problem underlying the invention will now be explained with reference to FIG. 3. A VBI decoder receiving the full-channel teletext transmission processes the data packets received in the vertical blanking interval only. Obviously, pages which start in the active video interval cannot be received at all. Pages which start in the vertical blanking interval are mixed up with rows of other pages. For example, if page 159 is requested, then the VBI decoder will capture the page header 159/0 in the VBI of field n. The decoder will ignore the further rows of page 159 because they are transmitted in the active video interval 20 of this field. Instead, the decoder will acquire rows 1–4 of page 171, rows 5–8 of page 183, rows 9–12 of page 195, etc. which are transmitted in subsequent VBIs and deemed to be part of page 159. Needless to say that the on-screen result is a mess of rows taken from different pages.

Figures 4, 5:
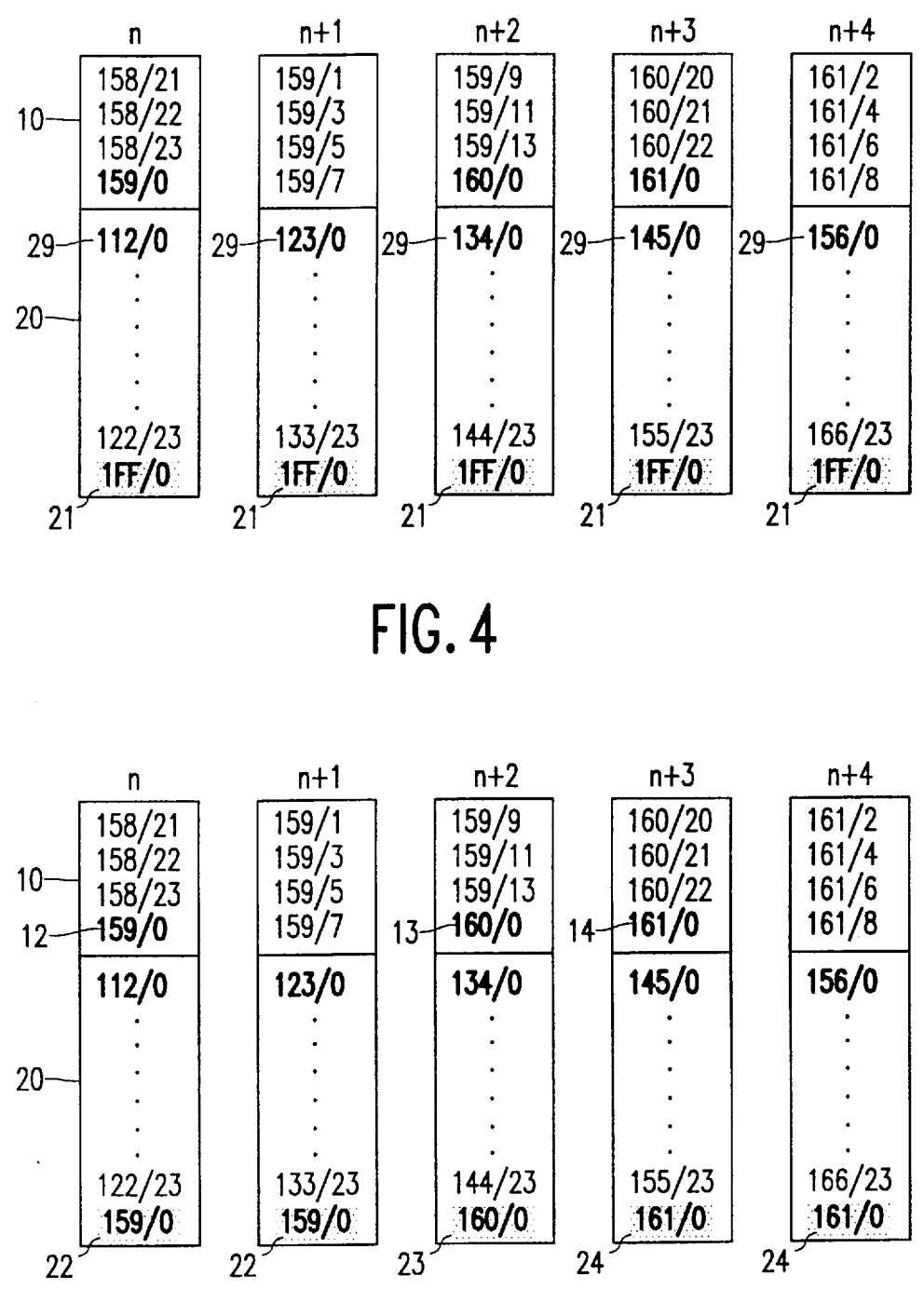

FIG. 4 shows a diagram illustrating a full-channel teletext transmission in accordance with the invention. Teletext pages 100–199 are cyclically transmitted in the vertical blanking interval 10 in a manner which is fully compatible with conventional VBI transmissions. The VBI transmission shown in FIG. 4 corresponds to the teletext transmission shown in FIG. 2. VBI decoders correctly respond to this VBI transmission because they only decode data packets within the VBI. The same teletext pages 100–199 are also transmitted in the active video interval 20. In the present example, 11 full pages are transmitted in 11*24=264 lines of each active video portion. The pages in the active video interval can be received by full-channel teletext decoders only. Each active video interval starts with a page header 29 which separates the rows in VBI 10 from those in a subsequent active video interval 20. The last data packet in the active video interval is a supplemental page header 21 which similarly separates the rows in an active video interval from those in the subsequent VBI. The supplemental header identifies a page different from the last page of the active video interval. The effect thereof will now be explained. Let it be assumed that a full-channel decoder is instructed to acquire page 122. This page is acquired from the active video interval of field n. In the VBI of field n+1, rows 1, 3, 5, 7 of page 159 are about to be transmitted. Without supplemental page header 21 at the end of the active video interval of field n, the full-channel decoder would consider these rows as rows of requested page 122. The rows would then overwrite the corresponding rows of page 122. However, page header 21 completes the transmission of page 122 in field n and causes the full-channel decoder to stop the acquisition of this page. The transmission of pages 100–199 in the active video intervals is resumed by first transmitting a page header 29 (here the page header of page 123) in the subsequent active video interval.

It suffices for page header 21 to define a page number P which is different from the currently transmitted page. Preferably, P is a page number which is not normally requested, for example, a page number of which the units and/or tens are in the hexadecimal range A–F. Page number 1FF is used in the example of FIG. 4. The full-channel decoder will then always ignore the VBI rows because they are preceded by the header of a page which is never requested. This embodiment may be advantageous for particular applications.

In a preferred embodiment of the invention, the supplemental page header is a repetition of the page header of the currently transmitted VBI page. This embodiment is shown in FIG. 5. Herein, supplemental page headers 22 at the end of the active video intervals of fields n and n+1 are repetitions of page header 12 in the VBI of field n. Similarly, page header 23 at the end of the active video interval of field n+2 is a repetition of page header 13 in the VBI of field n+2, and page headers 24 at the end of the active video intervals of fields n+3 and n+4 are repetitions of page header 14 in the VBI of field n+3. With this embodiment it is achieved that the full-channel decoder also captures the pages which are transmitted in the VBI. If the VBI page is a requested page, the decoder "re-opens" said page whenever the relevant page header is received. For example, if page 159 is a requested page, page headers 22 cause the full-channel decoder to indeed acquire rows 1, 3, 5, 7, 9, 11, 13 which are transmitted in the VBIs of fields n and n+1.

In the examples shown in FIGS. 4 and 5, an integral number (here 11) of pages is transmitted in 11*24=264 lines of each active video interval. More lines are available in the active video interval, but the number of lines is insufficient to accommodate twelve full pages. FIG. 6 shows a diagram illustrating a more efficient embodiment of full-channel teletext transmission in accordance with the invention. More than 11, but slightly less than 12 pages are now accommodated in each active video interval 20. Pages transmitted in the active video interval are thus interrupted by VBI pages. For example, page 123 is partly transmitted in field n and partly in field n+1. In this embodiment, the page header of the page currently transmitted in the active video interval is repeated at the beginning of the next active video interval. Thus, page header 26 in the first line of the active video interval of field n+1 is a repetition of page header 25 in field n. If page 123 is a requested page, the full-channel decoder first acquires rows 1–17 in field n, then stops the acquisition due to supplemental page header 22 and then resumes the acquisition of page 123 in response to the repeated page header 26 in field n+1 to acquire the still missing rows 18–23 of this page.

It is to be noted that the supplemental page header data packet is not necessarily the last data packet in an active video interval. The supplemental page header may be followed by one or more text rows if the broadcaster considers this to be convenient. For example, the hexadecimal page header 21 in FIG. 4 may be followed by one or more text rows to fill up space in the active video interval. Similarly, page headers 22–24 in FIGS. 5 and 6 may be followed by one or more text rows in addition to the text rows of the current VBI page.

Figure 7:
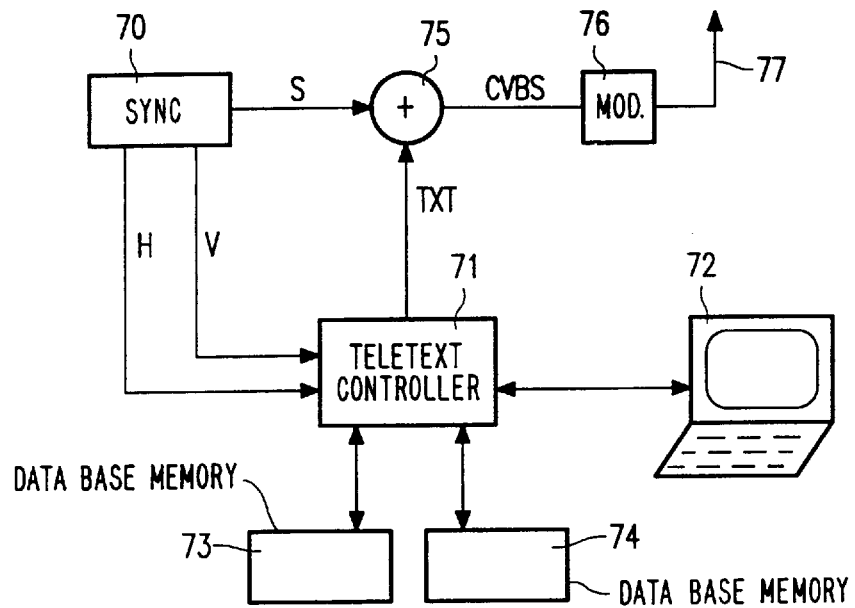
FIG. 7 shows a schematic diagram of a teletext transmitter arrangement in accordance with the invention.

FIG. 7 shows a schematic diagram of a teletext transmitter arrangement in accordance with the invention. The arrangement comprises a sync circuit 70 which generates a conventional synchronization signal S, a horizontal sync pulse H, and a vertical sync pulse V. The arrangement further comprises a teletext controller 71, an editing station 72 for editing teletext pages, a first database memory 73 and a second database memory 74. The teletext controller applies data packets TXT to a combiner circuit 75 for combination with the composite sync signal S. The resulting composite video signal CVBS is modulated by a modulator 76 and applied to an antenna 77.

Figure 8:
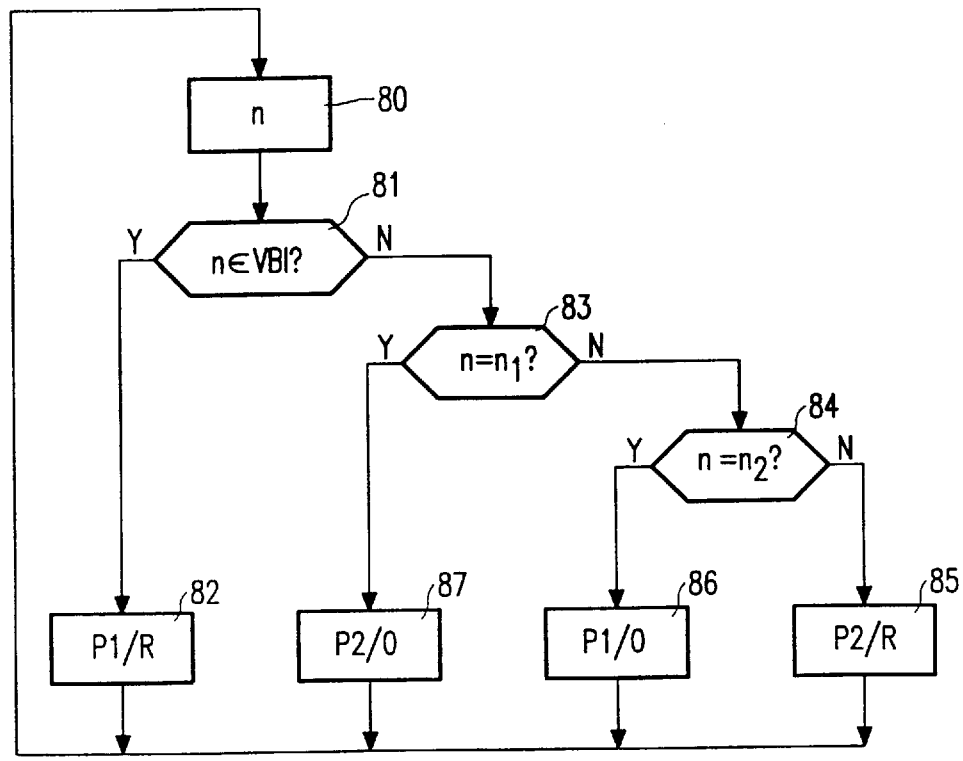
FIG. 8 shows a flowchart explaining the operation of a teletext generator which is shown in FIG. 7.

The teletext controller 71 receives the sync pulses H and V and is adapted in response thereto to determine the current TV line number n. The further operation of the teletext controller will now be described with reference to a flowchart which is shown in FIG. 8. In a step 80, the teletext controller waits for a line pulse H and determines whether a teletext data packet is to be transmitted in the current TV line. If a data packet is to be transmitted, the controller checks in a step 81 whether or not the current TV line n is a line of the vertical blanking interval VBI. If that is the case, a step 82 is carried out in which a data packet is read from the first database memory 73 and applied to combiner 75. In the first memory, the data packets of pages to be transmitted in the vertical blanking interval are stored in their transmission order. The currently transmitted data packet is denoted P1/R, in which P1 represents the page number and R the row number of the currently transmitted teletext page.

If the current TV line is not a line of the vertical blanking interval, it is a line of the active video interval. Now, the teletext controller checks in a step 83 whether the current TV line is the first line $n_1$ of this interval to accommodate a data packet, and in a step 84 whether it is the last line $n_2$ of this interval. If the current TV line is not the first or last line, a step 85 is carried out, in which a data packet is read from second database memory 74 and applied to combiner 75. In the second memory, the data packets of pages to be transmitted in the active video interval are stored in transmission order. The currently transmitted data packet is denoted P2/R, in which P2 represents the page number and R the row number of the currently transmitted teletext page.

In the last line $n_2$ of the active video interval, a step 86 is carried out. In this step, the teletext controller generates and transmits a supplemental page header. In the embodiment shown in FIG. 8. This supplemental page header is denoted P1/0 which is the header of the page currently transmitted in the vertical blanking interval (see page header 22–24 in FIGS. 5 and 6).

In the first line $n_1$ of the active video interval, a step 87 is carried out. In this step, the teletext controller generates and transmits the header of the page last transmitted in the previous active video interval (see page header 26 in FIG. 6).

As already mentioned hereinbefore, teletext services can also be operated in a parallel magazine mode. In this mode, up to eight teletext magazines are transmitted simultaneously. The data packets of different magazines (identified by their magazine number M) are interleaved. In the parallel magazine mode, a page is not completed until a different page header in the same magazine is transmitted. The parallel magazine mode is indicated by one of the control bits C (see FIG. 1A) in each page header.

FIG. 9 shows a diagram illustrating an embodiment of a full-channel teletext transmission in the parallel magazine mode in accordance with the invention. In this example, a first magazine comprising pages 100–199 and a second magazine comprising pages 200–299 are transmitted in the parallel mode. More particularly, each magazine is transmitted in two lines of the vertical blanking interval 10 and 144 lines of the active video interval 20. The VBI transmission can be decoded by conventional VBI decoders. In order that a full-channel decoder does not consider VBI rows of a certain magazine to belong to a page which is currently transmitted in the active video interval, supplemental page headers are provided in the active video intervals for each magazine. Accordingly, page header 27 is a supplemental page header to temporarily close the transmission of the last page 1XX (page 118 in field n, page 124 in field n+1, etc.) in the active video interval. The header prevents VBI page 159 from being mixed up with that page. Similarly, page header 28 is a supplemental page header to temporarily close the last page 2XX (page 293 in field n, page 299 in field n+1, etc.). This header prevents VBI page 210 from being mixed up with that page. In view of the foregoing it will be appreciated that a hexadecimal supplemental page header (e.g. 1FF and 2FF, respectively) would perform adequately. However, in the present example, the page header of the currently transmitted VBI page (159 and 210, respectively) is repeated to allow the full-channel decoder to capture VBI pages as well.

In FIG. 9, each supplemental header immediately succeeds the data packets of the corresponding magazine. The supplemental page headers may also be accommodated at the end of the interval. The only essential factor is that they are transmitted after the last data packet of the corresponding magazine.

In summary, conventional teletext decoders only respond to teletext data lines in the vertical blanking interval of a television signal. The decoders erroneously respond to full-channel teletext transmissions in which all lines of the television signal are used for teletext. The method in accordance with the invention transmits teletext pages in the vertical blanking interval of the television signal in a conventional manner. Additionally, pages are also transmitted in the active video interval. A supplemental page header in each active video interval is provided to prevent teletext rows in the vertical blanking interval from being interpreted as rows of a page which is currently transmitted in the active video interval.

I claim:

1. A method of transmitting teletext pages in vertical blanking intervals and active video intervals of a television signal, comprising the steps of:
   transmitting, for each page, a page header data packet identifying the page;
   transmitting a plurality of further data packets;
   transmitting the data packets for a first series of pages in vertical blanking intervals;
   transmitting the data packets for a second series of pages in active video intervals; and
   transmitting, after the data packets for the last page have been transmitted in the active video interval, a supplemental page header data packet identifying a page different from said last page.

2. A method as claimed in claim 1, wherein the supplemental page header data packet identifies a hexadecimally numbered teletext page.

3. A method as claimed in claim 1, wherein the supplemental page header identifies the page which is currently transmitted in the vertical blanking interval.

4. A method as claimed in claim 1, characterized by first transmitting a page header data packet in a subsequent active video interval prior to transmitting further data packets in said subsequent active video interval.

5. A method as claimed in claim 4, wherein said first transmitted page header data packet is the page header data packet of said last page.

6. A method as claimed in claim 2, characterized by first transmitting a page header data packet in a subsequent active video interval prior to transmitting further data packets in said subsequent active video interval.

7. An arrangement for transmitting teletext pages in vertical blanking intervals and active video intervals of a television signal, each page comprising a page header data packet identifying the page and a plurality of further data packets, characterized by means for transmitting the data packets for a first series of pages in vertical blanking intervals and transmitting the data packets for a second series of pages in active video intervals, said means being arranged to transmit, after the data packets for the last have been page transmitted in an active video interval, a supplemental page header data packet identifying a page different from said last page.

8. An arrangement as claimed in claim 6, wherein the supplemental page header data packet identifies a hexadecimally numbered teletext page.

9. An arrangement as claimed in claim 6, wherein the supplemental page header identifies the page which is currently transmitted in the vertical blanking interval.

10. An arrangement as claimed in claim 9, wherein said means are arranged to first transmit a page header data packet in a subsequent active video interval prior to transmitting further data packets in said subsequent active video interval.

11. An arrangement as claimed in claim 10, wherein said first transmitted page header data packet is the page header data packet of said last page.

12. An arrangement as claimed in claim 7, wherein said means are arranged to first transmit a page header data packet in a subsequent active video interval prior to transmitting further data packets in said subsequent active video interval.

13. An arrangement as claimed in claim 12, wherein said first transmitted page header data packet is the page header data packet of said last page.

14. A television signal comprising teletext pages in vertical blanking intervals and active video intervals of said television signal, each page comprising a page header data packet identifying the page and a plurality of further data packets, characterized by accommodating the data packets for a first series of pages in vertical blanking intervals and accommodating the data packets for a second series of pages in active video intervals, the data packets for the last page transmitted in an active video interval being followed by a supplemental page header data packet identifying a page different from said last page.

15. A television signal as claimed in claim 14, wherein the supplemental page header data packet identifies a hexadecimally numbered teletext page.

16. A television signal as claimed in claim 14, wherein the supplemental page header identifies the page which is currently transmitted in the vertical blanking interval.

17. A television signal as claimed in claim 16, further comprising a second supplemental page header data packet in a subsequent active video interval disposed prior to further data packets in said subsequent active video interval.

18. A television signal as claimed in claim 17, wherein said second supplemental page header data packet is the page header data packet of said last page.

19. A television signal as claimed in claim 15, further comprising a second supplemental page header data packet in a subsequent active video interval disposed prior to further data packets in said subsequent active video interval.

20. A television signal as claimed in claim 19, wherein said second supplemental page header data packet is the page header data packet of said last page.

* * * * *